US010754860B2

(12) United States Patent
Shan et al.

(10) Patent No.: US 10,754,860 B2
(45) Date of Patent: Aug. 25, 2020

(54) APPARATUS AND METHOD FOR RANKING CONTENT CATEGORIES

(71) Applicant: Futurewei Technologies, Inc., Plano, TX (US)

(72) Inventors: Jerry Zhaolin Shan, Palo Alto, CA (US); Luyi Wang, Woodside, CA (US)

(73) Assignee: Futurewei Technologies, Inc., Plano, TX (US)

( * ) Notice: Subject to any disclaimer, the term of this patent is extended or adjusted under 35 U.S.C. 154(b) by 968 days.

(21) Appl. No.: 15/340,921

(22) Filed: Nov. 1, 2016

(65) Prior Publication Data

US 2018/0121431 A1  May 3, 2018

(51) Int. Cl.
*G06F 16/2457* (2019.01)
*G06F 16/28* (2019.01)
*G06F 16/90* (2019.01)

(52) U.S. Cl.
CPC ...... *G06F 16/24578* (2019.01); *G06F 16/285* (2019.01); *G06F 16/90* (2019.01)

(58) Field of Classification Search
CPC .. G06F 16/24578; G06F 16/285; G06F 16/90; G06F 16/3322; G06F 16/437; G06F 16/90324

(Continued)

(56) References Cited

U.S. PATENT DOCUMENTS

| 2007/0094042 A1* | 4/2007 | Ramer | G06Q 30/0254 |
| | | | 705/1.1 |
| 2010/0057645 A1* | 3/2010 | Lauritsen | G06N 5/042 |
| | | | 706/11 |

(Continued)

FOREIGN PATENT DOCUMENTS

| CN | 103731738 A | 4/2014 |
| CN | 104182515 A | 12/2014 |

(Continued)

OTHER PUBLICATIONS

Dirichlet distribution, Wikipedia, pp. 1-12, page last modified Oct. 30, 2016, retrieved from https://en.wikipedia.org/wiki/Dirichlet_distribution.

(Continued)

*Primary Examiner* — James Trujillo
*Assistant Examiner* — Fariborz Khoshnoodi
(74) *Attorney, Agent, or Firm* — Fish & Richardson P.C.

(57) ABSTRACT

An apparatus and method are provided for ranking content categories. Multiple sessions of usage data is collected for usage activities of a plurality of users (associated with a group) on a plurality of categories of content. The usage data is analyzed for an average group usage of each category across the sessions and a variation of the average group usage of each category across the sessions. Individual usage data is also collected for usage activities of at least one user on the categories of content. The individual usage data reflects an aggregated usage of each category for the at least one user. Category usage is estimated on each category for the at least one user based on a weighted combination of the aggregated usage and the average group usage according to the variation. An amount of weight of the aggregated usage in the weighted combination is inversely related to the variation. The categories of content are ranked, via at least one processor, utilizing the estimated category usage on each category. Further, a presentation including the ranking is sent to a user device of the at least one user for being output via an interface.

20 Claims, 8 Drawing Sheets

(58) Field of Classification Search
USPC .................................................. 707/748, 752
See application file for complete search history.

(56) References Cited

U.S. PATENT DOCUMENTS

| | | | | |
|---|---|---|---|---|
| 2010/0076994 A1* | 3/2010 | Soroca | ................ | G06F 16/9577 |
| | | | | 707/769 |
| 2011/0125509 A1* | 5/2011 | Lidstrom | ............... | G06Q 30/02 |
| | | | | 705/1.1 |
| 2019/0260879 A1* | 8/2019 | Raleigh | ................ | H04M 15/66 |

FOREIGN PATENT DOCUMENTS

| | | |
|---|---|---|
| CN | 104899215 A | 9/2015 |
| WO | 2015128536 A1 | 9/2015 |

OTHER PUBLICATIONS

Collaborative filtering, Wikipedia, pp. 1-9, page last modified on Oct. 27, 2016, retrieved from https://en.wikipedia.org/wiki/Collaborative_filtering.

* cited by examiner

APPARATUS AND METHOD FOR RANKING CONTENT CATEGORIES

FIELD OF THE INVENTION

The present invention relates to content recommendation engines, and more particularly to systems for recommending categories of content.

BACKGROUND

Typically, when making recommendations on various systems (e.g. e-consumption sites, etc.) for digital content (e.g. news, music, videos, movies, and etc.), such systems must find the best matches between a supply (e.g. news items) and a demand (e.g. what items a particular user is looking for or items of interest), and then make a recommendation. To date, such systems are quite limited. Just by way of example, they are: generally static in nature, incapable of effectively making recommendations at start-up in the absence of any information on a behavior of a particular user, and/or incapable of effectively leveraging a Direchlet distribution in the context of content category ranking since Direchlet distribution parameters are generally not available.

SUMMARY

An apparatus and method are provided for ranking content categories. Multiple sessions of usage data is collected for usage activities of a plurality of users (associated with a group) on a plurality of categories of content. The usage data is analyzed for an average group usage of each category across the sessions and a variation of the average group usage of each category across the sessions. Individual usage data is also collected for usage activities of at least one user on the categories of content. The individual usage data reflects an aggregated usage of each category for the at least one user. Category usage is estimated on each category for the at least one user based on a weighted combination of the aggregated usage and the average group usage according to the variation. An amount of weight of the aggregated usage in the weighted combination is inversely related to the variation. The categories of content are ranked, via at least one processor, utilizing the estimated category usage on each category. Further, a presentation including the ranking is sent to a user device of the at least one user for being output via an interface.

In a first embodiment, additional individual usage data may be collected for additional usage activities of the at least one user on the categories of content. Further, the ranking may be dynamically adjusted based on the additional individual usage data.

In a second embodiment (which may or may not be combined with the first embodiment), a selection may be received of one or more of the ranked categories via the interface. Further, a plurality of content options may be ranked for presenting the ranked content options in connection with the selected one or more ranked categories via the interface for selection by the at least one user. As an option, the content options may be ranked utilizing collaborative filtering, a plurality of rules, and/or matrix characteristics.

In a third embodiment (which may or may not be combined with the first and/or second embodiments), at least one parameter associated with the average group usage may be estimated via the analysis of the usage data by: generating a first covariance matrix of a first distribution; calculating a first trace of the first covariance matrix; and setting a second trace of a second covariance matrix of a second distribution to be the first trace of the first covariance matrix. As an option, the first distribution may include a Dirichlet-multinomial distribution. Further, the second distribution may include a Dirichlet distribution. Still yet, the at least one parameter may include a location parameter, a concentration parameter, and/or a mean parameter.

In a fourth embodiment (which may or may not be combined with the first, second, and/or third embodiments), the at least one user may include one user of the plurality of users.

To this end, in some optional embodiments, one or more of the foregoing features of the aforementioned apparatus and/or method may enable use of a Direchlet distribution in the context of content category ranking by using estimations of Direchlet distribution parameters that would otherwise not be available. Further, by virtue of the collection of multiple sessions of usage data, the abovementioned parameter estimation technique may be employed to avoid the use multiple equations (that would result from using a traditional moment method) which, in turn, could introduce conflicts. Further, such category ranking may be dynamically improved as additional user behavior becomes available. These and other technical achievements, in turn, result in more relevant content recommendation for a particular user, thereby improving an overall user experience. It should be noted that the aforementioned potential advantages are set forth for illustrative purposes only and should not be construed as limiting in any manner.

DETAILED DESCRIPTION

Figure 1:
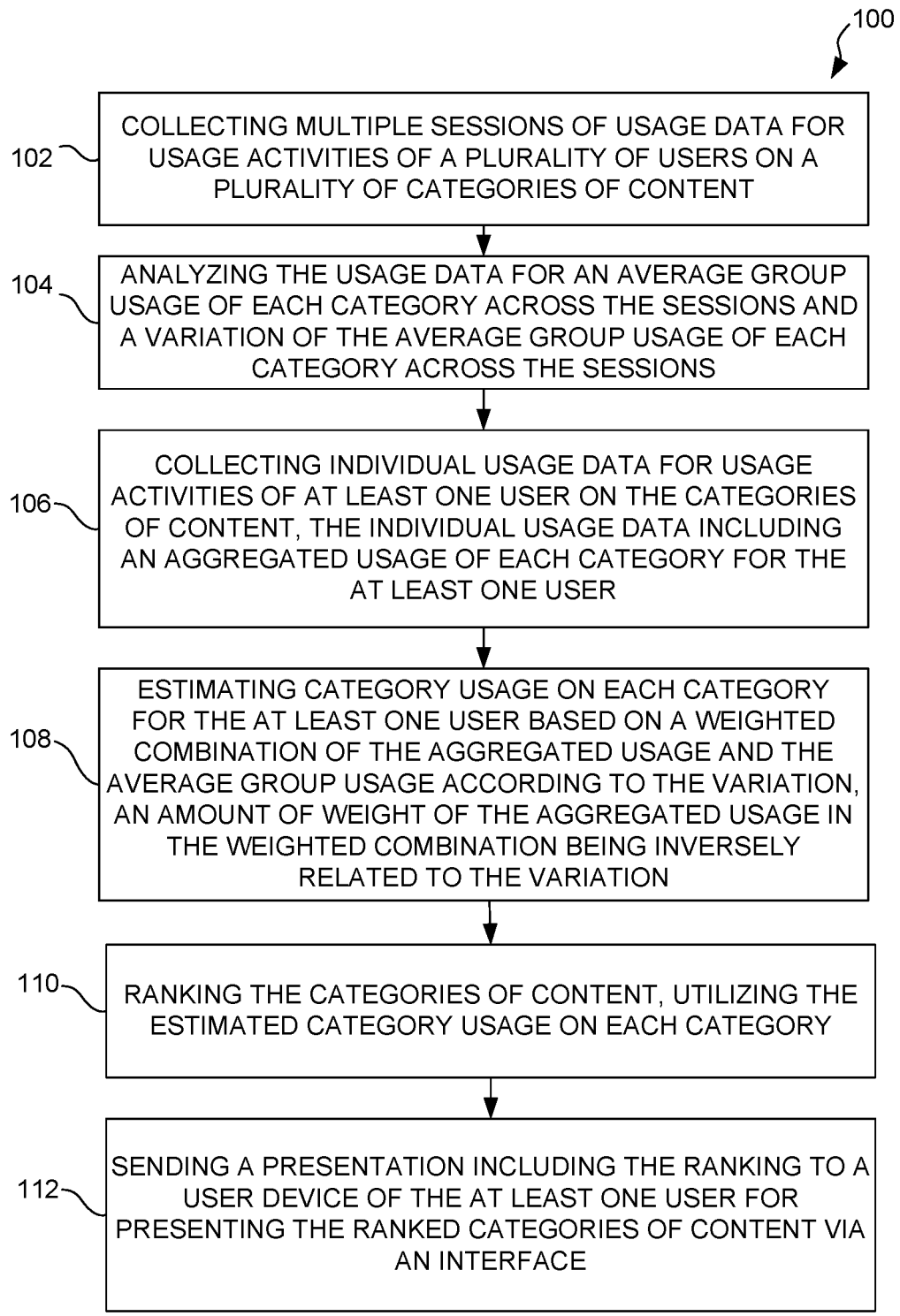
FIG. 1 illustrates a method for ranking content categories, in accordance with one embodiment.

FIG. 1 illustrates a method 100 for ranking content categories, in accordance with one embodiment. As shown, in operation 102, multiple sessions of usage data is collected for usage activities of a plurality of users on a plurality of categories of content. As will soon become apparent, the aforementioned users are associated with a group. Such group may be organized in any desired manner and may take any form (e.g. a social group/network, a sample group, a group including at least one common aspect, a random group, etc.).

As an option, the foregoing group may be automatically detected and/or identified from social network associations gleaned from a social network, business relationship network, or any other type of network, for that matter. For example, in one possible embodiment, the present method 100 may communicate with a social network service implemented via one or more data servers (an example of which will be described later), and thereby receive social group information from such social network service, while monitoring user activities, etc. As the information of a social group may reflect user behavior, a mechanism may, in one possible embodiment, be provided to utilize group behavior data to afford a more precise and predictive estimation of individual user preferences, as will become apparent.

In the context of the present description, the aforementioned sessions in operation 102 may refer to any separate instances of usage activity during a particular time period (e.g. year, month, week, day, hour, etc.), and the usage data may include any information that includes, describes, and/or is derived in connection with observed or monitored usage activity of the users in connection with the categories of content. Further, the usage activity may refer to any activity in connection with the categories including, but not limited to viewing, browsing, selecting, inputting, editing, sharing, purchasing, and/or any other behavior in connection with the categories of content. Still yet, the content may include subject matter taking any form including, but not limited to media (e.g. video, audio such as music, images, etc.), text (e.g. news, entertainment, advertisements, etc.), and/or any other format of content.

In various embodiments, the usage data may be collected in any desired manner. For example, in one possible automated embodiment, the usage data may be received via a collection effort whereby input (e.g. selections online or via a device, etc.) of the users is monitored and related data is collected and stored. In other embodiments, the usage data may be simply received from a third party source that may collect such data via any automated and/or manual process.

With continuing reference to FIG. 1, the usage data is analyzed in operation 104 for an average group usage of each category across the sessions and a variation of the average group usage of each category across the sessions. In the context of the present description, the aforementioned average group usage each includes any data that includes, describes, and/or is derived from an average (e.g. arithmetic mean, median, mode, etc.) of usage in connection with a particular content category that is observed during the sessions. Just by way of example, in one possible embodiment where the usage includes user selections of a particular content category, the aforementioned average group usage may include a total number of such user selections for the particular content category divided by a total number of sessions.

Also in the context of the present description, the variation of the average group usage of each category across the sessions includes any data that includes, describes, and/or is derived from a variation (e.g. variance, covariance, spread, etc.) in connection with the average group usage that is observed during the sessions. In one possible embodiment where the usage includes user selections of a particular content category, the aforementioned variation may include a variance of such user selections for the particular content category with respect to other content categories. More information regarding techniques by which such variation may be calculated will be set forth later during the description of different embodiments in connection with subsequent figures.

In operation 106, individual usage data is also collected for usage activities of at least one user (hereinafter "user(s)") on the categories of content. It should be noted that, in the present description, the individual usage data, usage activities, and the categories of content of operation 106 are defined as set forth above in connection with the description of operation 102. With that said, the individual usage data relates to usage activities of the aforementioned user(s) which may or may not be one of the aforementioned plurality of users mentioned during the description of operation 102. Further, in embodiments where a single account is capable of being used by one or more users, the user(s) may include a single user or multiple users.

In one embodiment, it is contemplated that the user(s) may be a new user(s). In such embodiment, the aforementioned average group usage may substitute and/or compensate for a lack of sufficient information on the new user(s), as will become apparent. Such lack of information may take a variety forms and result from a variety of reasons including, but not limited to shorter observation durations, less use frequency, data sparsity, short or absent user history, less categorized content usage, etc. Further, in some optional embodiments, the average group usage may facilitate the identification of trends that may potentially influence/lead the new user(s), thereby permitting prediction of user behavior.

Still yet, in the case of the individual usage data, such data reflects (e.g. includes, describes, and/or is derived from, etc.) an aggregated usage of each category for the user(s). In one possible embodiment where the usage includes user(s) selections of a particular content category, the aforementioned individual usage data may include a total number of such user(s) selections for the particular content category. While the operation 106 is shown to follow operations 102-104, it should be noted that operations 102 and/or 104 may follow operation 106, or any other operation of the method 100 of FIG. 1. For that matter, it should be noted that no order among the different operations of the method 100 of FIG. 1 is to be necessarily implied, and the illustrated order is not to be construed as limiting in any manner.

In operation 108, category usage is estimated on each category for the user(s) based on a weighted combination of the aggregated usage and the average group usage according to the variation. In the context of the present description, such weighted combination may refer to any expression that takes into account both the aggregated usage and the average group usage according to the variation, and applies at least one weight in connection with the aggregated usage. For example, in one possible embodiment, a first weight may be applied to (e.g. multiplied by) the aggregated usage to generate a first product, and a second weight may be applied to (e.g. multiplied by) the average group usage to generate a second product, after which the first and second products are summed.

Further, an amount of weight of the aggregated usage in the weighted combination is inversely related to the variation. In one possible embodiment, the purpose of such inverse relation is to properly reflect the weights to be assigned to the group of the users and to the individual user(s). More information regarding other techniques for implementing the weighted combination in accordance with different embodiments will be set forth during the description of subsequent figures and, in particular, Equations 33-36.

With continuing reference to FIG. 1, the categories of content are ranked, in operation 110 via at least one processor, utilizing the estimated category usage on each category.

In the context of the present description, the foregoing ranking may include any setting or adjustment of a relative order, relative position, and/or any other relative aspect of the content categories, that is a function of the estimated category usage on each category. For example, in one possible embodiment, a first content category may have a first estimated category usage for the user(s), and a second content category may have a second estimated category usage for the user(s) that indicates a lower probability of usage as compared to the first estimated category usage. In such embodiment, the first content category may be ranked differently (e.g. higher, to the exclusion of, etc.) the second content category.

Further, in operation 112, a presentation including the ranking is sent to a user device of the user(s) for being output via an interface (e.g. a display, audio interface, etc.). The presentation of the ranked content categories may be carried out as a function of the ranking, in any desired manner. For example, in one embodiment, the aforementioned first content category may be positioned in a list before the second content category. As another option, the first content category may be emphasized (e.g. bolded, underlined, highlighted, more strategically placed, etc.) while the second content category is less emphasized, not emphasized, de-emphasized, or even omitted.

While not shown, a selection may be received of one or more of the ranked categories via the interface. Further, a plurality of content options may be ranked for presenting the ranked content options in connection with the selected one or more ranked categories via the interface, for selection by the at least one user. As an option, the content options may be ranked utilizing collaborative filtering, a plurality of rules, and/or matrix characteristics. More information regarding various possible aspects and uses of the foregoing features will be set forth during the description of different embodiments shown in subsequent figures.

Still yet, in one possible embodiment, additional individual usage data may be collected for additional usage activities of the user(s) on the categories of content, similar to operation 106. Further, the ranking of operation 110 may be dynamically adjusted based on the additional individual usage data. Again, more information regarding various possible aspects and uses of such feature will be set forth during the description of different embodiments shown in subsequent figures.

In still additional embodiments, at least one parameter associated with the average group usage that results from operation 104 may be estimated via the analysis of the usage data. For example, in one possible embodiment, a first covariance matrix of a first distribution (e.g. Dirichlet-multinomial distribution, etc.) may be generated, and a first trace of the first covariance matrix may be calculated. To this end, a second trace of a second covariance matrix of a second distribution (e.g. Dirichlet distribution, etc.) may be set to be the first trace of the first covariance matrix.

It should be noted that the aforementioned Dirichlet distribution may include any continuous (or pseudo-continuous) multivariate probability distribution parameterized by a vector of real numbers. In one possible embodiment, the Dirichlet distribution may be a multivariate generalization of a beta distribution. Also in the context of the present description, the abovementioned Dirichlet-multinomial distribution may refer to any discrete multivariate probability distribution of non-negative integers. In various embodiments, the Dirichlet-multinomial distribution may include a Dirichlet compound multinomial (DCM) distribution or multivariate Pólya distribution. Further, in differing embodiments, such Dirichlet-multinomial distribution may include a compound probability distribution, where a probability vector is drawn from the Dirichlet distribution with a parameter vector, and an observation is drawn from a multinomial distribution with a probability vector. Further, the aforementioned compounding may correspond to a Pólya urn model.

Further, in still additional embodiments, the at least one parameter may include a location parameter, a concentration parameter, and/or a mean parameter. In the context of the present description, the location parameter may refer to any parameter that defines a location in connection with a distribution. For example, in one possible embodiment, such location may be that of a peak (e.g. in magnitude) of the distribution. Further, the concentration parameter may refer to any parameter that defines a concentration of point values of a distribution. For example, in one possible embodiment, the concentration parameter may indicate a degree of concentration (e.g. density) of values of the distribution.

To this end, in some optional embodiments, one or more of the foregoing features may enable use of a Direchlet distribution in the context of content category ranking by using estimations of Direchlet distribution parameters that would otherwise not be available. Further, by virtue of the collection of multiple sessions of usage data, the abovementioned parameter estimation technique may be employed to avoid the use multiple equations (that would result from using a traditional moment method) which, in turn, could introduce conflicts. Such conflict avoidance will be elaborated upon in the description of subsequent embodiments during reference to subsequent figures and, in particular, Equations 20-32. Further, such category ranking may be dynamically improved as additional user usage activity becomes available. These and other technical achievements, in turn, result in more relevant content recommendation for a particular user, thereby improving an overall user experience.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the other features described.

Specifically, various embodiments will now be described in the context of a system and method for providing news-related recommendations. It should be noted that such news-related content is strictly illustrative in nature and should not be construed as limiting in any manner. In use according to such embodiment, personalized recommendations for K major categories of news may be presented to a particular user. For example, the particular user may be interested in multiple categories of news, with different degrees of interest or urgency. Using such information, it may be assumed that a discrete probability distribution for the interest degrees $p=(p_1, p_2, \ldots, p_K)$ is a likelihood vector indicating interest in each of the K categories. In one embodiment, a recommendation may be built (e.g. a news list compiled for presentation) based on the order of the magnitude of the components in the aforementioned likelihood vector.

However, such likelihood vector may not necessarily be known when the aforementioned system and method is first used in connection with a new user. As such, a user's news consumption behavior for a period of time may be tracked in order to collect individual usage data, for learning purposes. In one embodiment, such individual usage data may be denoted as Z, which is a vector of the total counts for each news categories that the user has consumed within a defined time period. Assuming stationarity in the user's news consumption behavior in the defined time period, represented by Z, such individual usage data Z has a multinomial distribution, that is Z~Mul(p), where p=($p_1$, $p_2$, . . . , $p_K$) is the likelihood vector. In terms of a probability mass function (PMF), following is a mathematical expression for such multinomial distribution.

$$P(Z_1 = z_1, Z_2 = z_2, \ldots, Z_K = z_K) = \frac{n!}{z_1! z_2! \ldots z_K!} p_1^{n_1} p_2^{n_2} \ldots p_K^{n_K} \quad \text{Equation 1}$$

where $Z_K$ is a component random variable, and $z_K$ is an observed value of the component random variable.

In one embodiment, $z_K$ may be a count of views/clicks by the particular user on the k-th news category, and n=$\Sigma z_K$ may be the total count of the views/clicks by the particular user across all of the categories.

Additionally, one statistical technique that may be used to estimate the likelihood vector may involve the use of the observations where each component random variable $Z_k$ has a binomial distribution $Z_K$~B(n, $p_k$). Therefore, E($Z_K$)=n$p_k$. An unbiased sample estimate for $P_k$ may be represented as follows.

$$\hat{p}_k = \frac{z_i}{n} = \frac{z_k}{\sum z_k} \quad \text{Equation 2}$$

Therefore, based on the sample data distribution, a recommendation order (for a number of news categories) may be determined by the magnitude of all the observation values $z_k$.

While Equations 1 and 2 above represent a deterministic approach to making recommendations, it should be noted that it, in some embodiments, such approach may exhibit drawbacks that warrant use of a more stochastic approach. For example, if the observation period is too short (and consequently the sample size too small), there may be a stability issue with the sample estimator. Additionally, in other embodiments, stationarity in the particular user's usage activity during the defined time period may not necessarily be assumed. For example, a time availability in different time segments (e.g. morning vs. evening, workdays vs. weekends) for the particular user can be quite different, which may significantly affect the user's choice of news consumption.

Figure 2A:
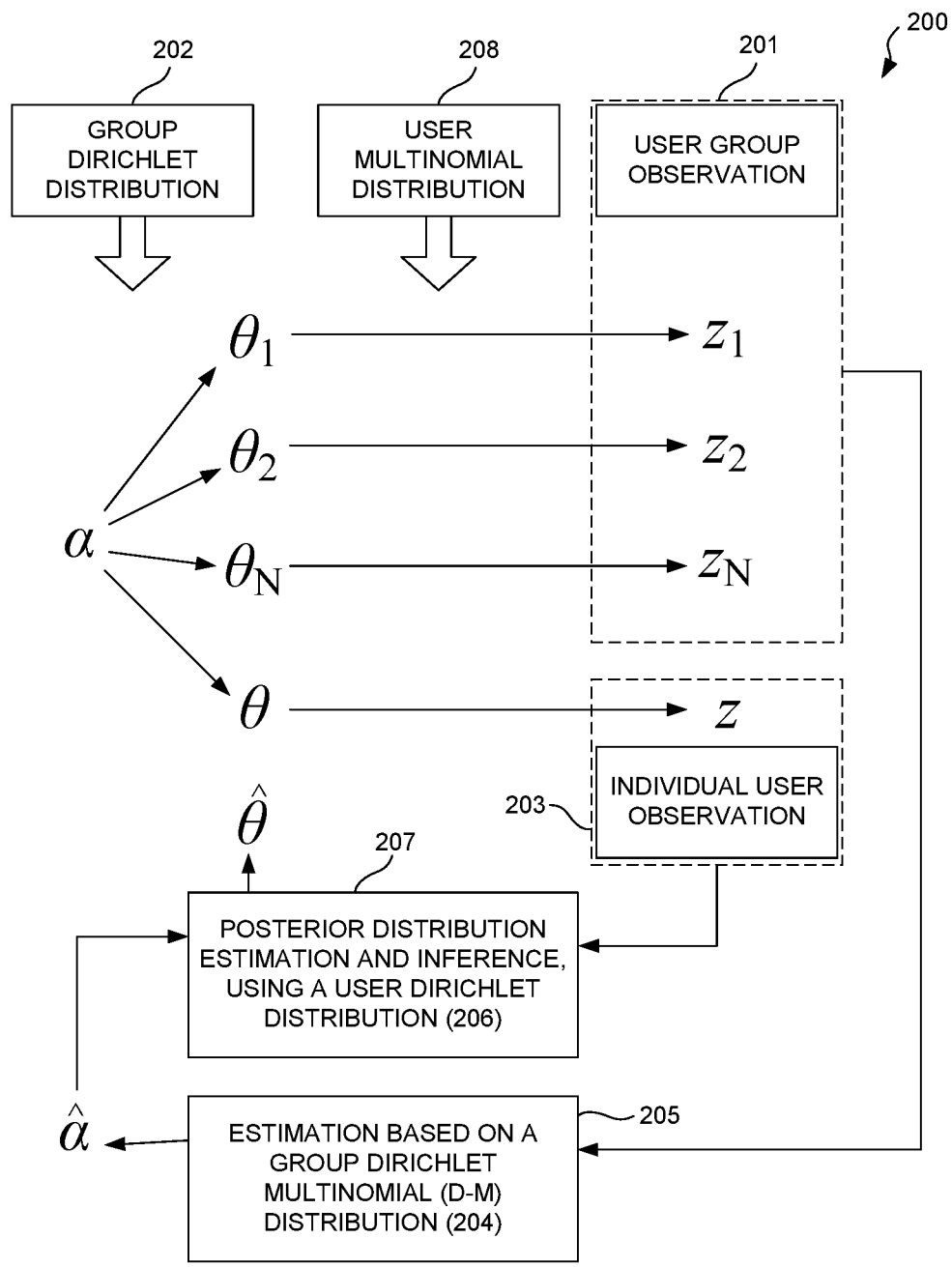
FIG. 2A illustrates a method for ranking content categories, in accordance with another embodiment.

Given these drawbacks with embodiments that take the foregoing deterministic approach, a more stochastically-driven system and method will now be set forth, in the context of FIG. 2A. As described earlier in connection with the aforementioned deterministic approach, an initial probability distribution may be associated with a likelihood parameter p for each item in a list of content categories to be ranked, where a recommendation list may include K items. Further, the likelihood parameter p behaves stochastically. To accommodate such fact that the likelihood parameter p behaves stochastically, a corresponding stochastic-specific notation θ is introduced during the description of FIG. 2A.

FIG. 2A illustrates a method 200 for ranking content categories, in accordance with another embodiment. As an option, the method 200 may be implemented in the context of any one or more of the embodiments set forth in any previous and/or subsequent figure(s) and/or description thereof. For example, the method 200 may incorporate any one or more features of the method 100 of FIG. 1. However, it is to be appreciated that the method 200 may be implemented in the context of any desired environment.

As shown, the method 200 involves the receipt of group usage data $z_{1, \ldots, N}$ 201 reflecting a group usage activity for each of a plurality of groups of users, as well as individual usage data $z_{user}$ 203 reflecting individual usage activity for a particular user. As will become apparent later, the individual usage data $z_{user}$ 203 may not necessarily be available during a first iteration of the method 200 in connection with a new particular user. Thus, in such embodiment, any initial content category ranking may be carried out (for some or all new users) based on just the group usage data $z_{1, \ldots, N}$ 201. After the presentation of such initial content category ranking, however, the individual usage data $z_{user}$ 203 may be collected in terms of how the new particular user behaves (e.g. selects, interacts, etc.) in connection with content categories. At such point, such individual usage data $z_{user}$ 203 may be available for use, as set forth below.

As shown in operation 205, a plurality of group parameters α are estimated including a group location parameter $α_{group-location}$, a group mean parameter $α_{group-mean}$, and/or a group concentration parameter $α_{group-concentration}$ of a group Dirichlet distribution 202, utilizing a group Dirichlet-multinomial distribution 204 in connection with the group usage data $z_{1, \ldots, N}$ 201 for each of the groups. In the context of the present description, the estimator of any parameter is denoted by placing a hat on the parameter's original notation. For example, for parameter α, the estimator is $\hat{α}$.

In use, a user Dirichlet distribution 206 is estimated, utilizing the individual usage data $z_{user}$ 203, and the estimated group parameters α of the group Dirichlet distribution 202 associated with at least one of the groups. Further, as indicated in operation 207, a user probability list parameter $\hat{θ}$ of a user multinomial distribution 208 is estimated utilizing the estimated user Dirichlet distribution 206 in connection with the individual usage data $z_{user}$ 203. In one embodiment that will be elaborated upon later, the estimation of the user probability list parameter $\hat{θ}$ of the user multinomial distribution 208 may be carried out by also utilizing the estimated group parameters α of the group Dirichlet distribution 202 in connection with the individual usage data $z_{user}$ 203.

To this end, a plurality of categories of content may be ranked for presenting to the particular user, based on the estimated user probability list parameter $\hat{θ}$ of the user multinomial distribution 208, for presenting the ranked categories to the particular user via an interface for selection by the particular user.

Thus, the method 200 may afford a model of an intelligent recommendation algorithm and a system that is improved based on constant learning. Specifically, additional individual usage data $z_{user}$ 203 reflecting additional user usage activity for the particular user may be received, and the aforementioned content ranking in accordance with the method 200 of FIG. 2A may be dynamically adjusted, based on the additional individual usage data $z_{user}$ 203. Specifically, the model may be dynamically built using the individual usage data $z_{user}$ 203 that is continuously observed in connection with the particular user and the group usage data $z_{1, \ldots, N}$ 201. Once incremental observations have been obtained for actual consumption activities by the particular user, such incremental observations may be used to produce an updated and personalized user probability list parameter $\hat{\theta}$, which may be used as a basis for a data-driven recommendation. As will soon become apparent, such user probability list parameter $\hat{\theta}$ may include both order and magnitude components, as both the probability order and the probability magnitude may be known.

More information will now be set forth regarding the foregoing parameters and operations of the method 200 of FIG. 2A. In one embodiment, an inference may be carried out in connection with operation 207 of the method 200, based on empirical information or domain knowledge. As mentioned earlier, such inference may be appropriate where no historical observation data for the user exists (i.e. no individual usage data $z_{user}$ 203 exists at start up), or where the observation period is too short. In such situation, the interest likelihood parameter p for each of the news categories (in a deterministic context) may be estimated, based on the empirical information or domain knowledge. To accommodate the fact that such likelihood parameter p behaves stochastically, the notation $\theta$ is introduced in the context of the present description to represent such stochastic nature, and it may be assumed that such notation has a Dirichlet distribution, or $\theta \sim \text{Dir}(\alpha)$, as noted earlier in the context of the group Dirichlet distribution 202 of FIG. 2A, for example. In such case, a PMF may be represented as follows, which is an exemplary Dirichlet distribution.

$$f(\theta) = \frac{1}{\text{Beta}(\alpha)} \prod_{i=1}^{K} \theta_i^{\alpha_i - 1} \qquad \text{Equation 3}$$

where:
the density function argument $\theta = (\theta_1, \theta_2, \ldots, \theta_K)$ is in an open (K-1) dimensional simplex,
all $\theta_i > 0$ and $\theta_1 + \theta_2 + \ldots + \theta_K = 1$,
$\alpha = (\alpha_1, \alpha_2, \ldots, \alpha_K)$ is a parameter vector for the density function where each component is a positive real number that represents a group location parameter, e.g. $\alpha_{group-location}$, and
Beta($\alpha$) is a beta function.

The expected value and variance of each individual component $\theta_1$ are as follows, respectively:

$$E(\theta_i) = \frac{\alpha_i}{\alpha_0} \qquad \text{Equation 4}$$

$$\text{Var}(\theta_i) = \frac{\alpha_i(\alpha_i - \alpha_i)}{\alpha_0^2(\alpha_0 + 1)} \qquad \text{Equation 5}$$

It may be further noted here that, for i≠j, $$\text{Cov}(\theta_i, \theta_j) = -\frac{\alpha_i \alpha_j}{\alpha_0^2(\alpha_0 + 1)} \qquad \text{Equation 6}$$

where:

$$\alpha_0 = \sum \alpha_i \qquad \text{(Equation 7)}$$

Therefore, based on the prior distribution, the recommendation order may be determined by a magnitude of all the $\alpha_1$ values.

As mentioned earlier, a plurality of group parameters $\alpha$ are used to define a Dirichlet distribution (e.g. see Equation 3, the group Dirichlet distribution 202 of FIG. 2A, etc.). Specifically, such group parameters $\alpha$ include the group location parameter $\alpha_{group-location}$, the group mean parameter $\alpha_{group-mean}$, and the group concentration parameter $\alpha_{group-concentration}$ which, together, define the Dirichlet distribution.

In use, the group parameters $\alpha$ may be specified as only a vector parameter, with each of the vector component including a non-negative real number. In such case, illustrative Dirichlet distributions Dir (1, 1, 1), Dir (0.1, 0.1, 0.1), and Dir (10, 10, 10) may, by way of example, be different, but a mean value of each Dirichlet distribution component may not necessarily depend on a scale, or magnitude, of parameters. In other words, for such distributions, the mean values of each component may be the same (e.g. 1/3). However, a difference between the distributions may include a concentration effect resulting from the scale, or magnitude, of the $\alpha$ parameter, where such concentration effect is embodied in the aforementioned group concentration parameter $\alpha_{group-concentration}$.

In order to elaborate on such concentration effect, a special case may be considered where all of the aforementioned vector components are equal, as set forth earlier where $\alpha = (\alpha^*, \alpha^*, \ldots, \alpha^*)$. In particular, $\alpha^*$, in such embodiment, may be a constant and average value reflecting all the components in the vector $\alpha$.

Figure 2B:
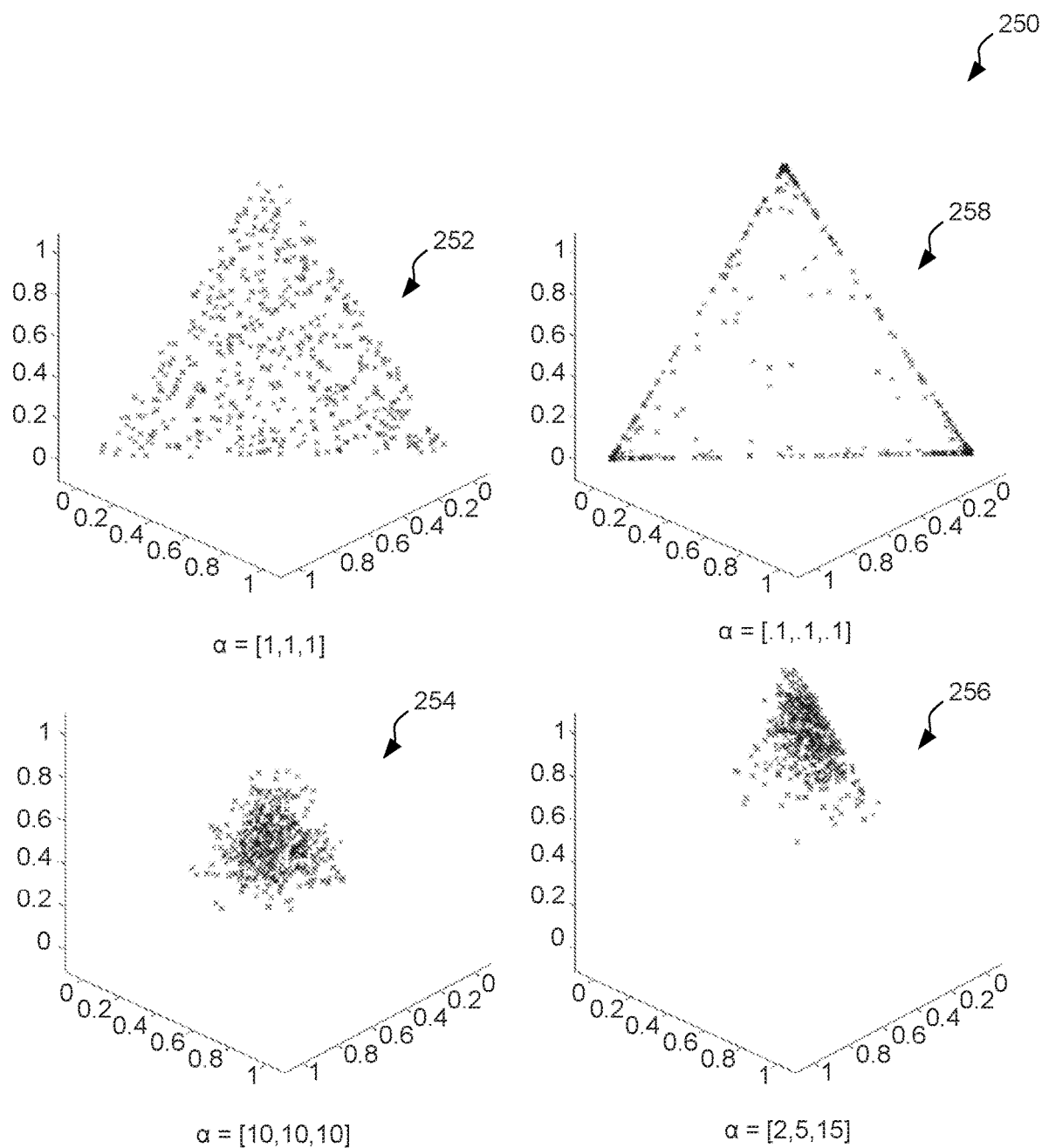
FIG. 2B shows a number of simplex space plots where a vector components have different values.

FIG. 2B shows a number of simplex space plots 250 where the foregoing $\alpha$ vector components have different values. As shown in a first plot 252 where $\alpha^* = 1$, there is no concentration and the distribution is uniform over a K-1 simplex space. As shown in a second plot 254 and a third plot 256 where $\alpha^* > 1$, the concentration may be toward a center of the simplex space. Further, as shown in a fourth plot 258 where $\alpha^* < 1$, the concentration may be toward the edges and vertices of the simplex space.

To provide a real world context of the simplex space plots 250 of FIG. 2B, reference may be made again to the previously-mentioned embodiment relating to a news category scenario. Specifically, for each category, there may be a percentage of readership, represented by $\alpha_i$. There may also be a concentration effect, for example, shown by a large percentage of viewers with certain persona or segment interest (e.g. breaking news or entertainment categories, etc.). The aforementioned concentration effect may thus result from an individual value magnitude of the $\alpha_i$, as well as a summation value of a subset of the vector components (see Equation 7). To this end, the aforementioned group concentration parameter $\alpha_{group-concentration}$ of FIG. 2A and, in particular, the magnitude thereof, may be useful in defining the group Dirichlet distribution 202 of FIG. 2A in connection with ranking and recommending news content categories.

More information will now be set forth regarding the estimation of the group parameters $\alpha$ of the group Dirichlet distribution 202 of FIG. 2A, in accordance with operation 205 of FIG. 2A. In particular, various techniques will be set forth for using the group Dirichlet-multinomial distribution 204 of FIG. 2A in connection with the group usage data 201, for the purpose of estimating the group parameters $\alpha$ of the group Dirichlet distribution 202. Specifically, reference is again made to the earlier mentioned Dirichlet distribution notation, $\theta \sim \text{Dir}(\alpha)$, which may include $\hat{\alpha}_i = \alpha_i / \alpha_D$, resulting in the following expressions.

$$E(\theta_i) = \tilde{\alpha}_i \text{ for } i = 1, 2, \ldots, K \quad \text{Equation 8}$$

$$\text{Var}(\theta_i) = \frac{\tilde{\alpha}_i(1-\tilde{\alpha}_i)}{\alpha_0 + 1} \text{ for } i = 1, 2, \ldots, K \quad \text{Equation 9}$$

$$\text{Cov}(\theta_i, \theta_j) = \frac{\tilde{\alpha}_i \tilde{\alpha}_j}{\alpha_0 + 1} \text{ for } 1 \le i \ne j \le K \quad \text{Equation 10}$$

In various embodiments, it may be difficult to estimate the parameter α from θ, as what is observed includes the group usage data 201 (e.g. Z), and not θ. However, relationships (or links) may exist between θ, Dir (α), and the group usage data 201 which may be exploited, for parameter estimation purposes. For example, given θ, the condition z|θ~Mul(θ) may be used, where θ may be treated as a stochastic variable and a hype parameter. Further, given α, the condition θ~Dir(α) may be used, where a may be a regular parameter to the group Dirichlet distribution 202.

To this end, through the foregoing relationships, there is a relationship between the parameter α and the group usage data 201 (e.g. Z). In order to estimate a from Z, the foregoing relationship may be exploited. As a compound distribution, the Dirichlet-multinomial distribution 204 may represent such relationship between α and Z, as evidenced by the following expressions that may represent the Dirichlet-multinomial distribution 204.

$$Pr(z\mid\alpha) = \int Pr(z\mid\theta)Pr(\theta\mid\alpha)d\theta \quad \text{Equation 11}$$

$$Pr(z\mid\alpha) = \frac{n!\Gamma(\alpha_0)}{\Gamma(n+\alpha_0)} \prod_{k=1}^{K} \frac{\Gamma(z_k + \alpha_k)}{z_k!\Gamma(\alpha_k)} \quad \text{Equation 12}$$

where
n is a sum of all the components of z, and
α is from the group Dirichlet distribution 202.

Additionally, the Dirichlet-multinomial distribution 204 may include the following properties.

$$(\text{mean}): E(z) = n\tilde{\alpha} \quad \text{Equation 13}$$

$$(\text{covariance}): \text{Cov}(z) = n\{diag(\tilde{\alpha}) - \tilde{\alpha}\tilde{\alpha}^T\}\frac{n+\alpha_0}{1+\alpha_0} \quad \text{Equation 14}$$

$$(\text{covariance}): \text{Cov}(z) = n\{diag(\tilde{\alpha}) - \tilde{\alpha}\tilde{\alpha}^T\}(1+\rho^2(n-1)) \quad \text{Equation 15}$$

$$\alpha_0 = \frac{1-\rho^2}{\rho^2} \quad \text{Equation 16}$$

where parameter p is an intra-class, or an intra-cluster, correlation.

In one embodiment, the parameter p is a positive correlation which may cause an over-dispersion relative to a multinomial distribution.

More information regarding the manner in which the aforementioned usage activity data Z may be used for estimation purposes will now be set forth in the context of making news recommendations. As a specific example, for each news article, a list of tags, keywords and categories associated with the news article may be assumed. For each news category and for all news articles in such category, a total number of times that a user has viewed the same in all sessions in a defined time period (e.g. one month, etc.) may be counted. In one possible embodiment, the total number of times may include repeated views. For each news category, the category percentage may be computed by dividing the number of news viewed in the category by the total number of news viewed in all categories. The resulting percentage vector, of length K, may then be specified as the α parameter in a normalized Dirichlet Distribution.

To provide greater detail, the following notations are introduced. For all users in a given group in connection with a defined time period (e.g. one month, etc.), there may be J sessions. As will soon become apparent, the number of sessions J is greater than 1 in order to have the capability of estimating a sample covariance matrix. For an individual session j, denoted by $z_{i,j}$, the number of views by all the users for all news articles in news category may be i. Based on such notations, an observation matrix may be constructed, as follows.

$$Z = \begin{bmatrix} z_{11} & z_{12} & \cdots & z_{1J} \\ z_{21} & z_{22} & \cdots & z_{2J} \\ \vdots & \vdots & \ddots & \vdots \\ z_{K1} & z_{K2} & \cdots & z_{dJ} \end{bmatrix} = (z_1, z_2, \ldots, z_J) \quad \text{Equation 17}$$

where each column is:

$$z_j = (z_{1j}, z_{2j}, \ldots, z_{Kj})^T \quad \text{Equation 18:}$$

Additionally, each column represents an observed value of the random variable z for a session, and each row represents the observations of a distribution component over all sessions, denoted by $\bar{z} = \Sigma\, z_j/J$, or the sample mean. As such, the percentage vector is the sample percentage, as follows.

$$\hat{\theta} = \left(\frac{z_1}{z_{\ldots}}, \frac{z_2}{z_{\ldots}}, \ldots, \frac{z_K}{z_{\ldots}}\right)^T \quad \text{Equation 19}$$

where $z_i = \Sigma_j z_{ij}$, or the summation of the elements in a row, and $z_{\ldots} = \Sigma_i \Sigma_j z_{ij}$, or the summation of all elements in the matrix.

In another embodiment, a moment method may be used to estimate all the parameters. Using such a moment method, there would be more equations than the number of parameters. For example, using the first set of equations in the first line on the first moment produces the following:

$$E(z) = n\tilde{\alpha} = \bar{z} \quad \text{Equation 20:}$$

Based on Equation 20, only one additional independent equation is needed as using all the additional equations from the variances may introduce conflict. In one embodiment, the additional independent equation may be selected based on the largest sample variance or the covariance. Additionally, the additional independent equation may be selected by setting the trace of the distribution covariance matrix to the one corresponding to the sample covariance matrix.

The trace of the distribution covariance matrix is as follows.

$$Tr[\text{Cov}(z)] = Tr[n\{\text{diag}(\tilde{\alpha}) - \tilde{\alpha}\tilde{\alpha}\}(1+\rho^2(n-1))] \quad \text{Equation 21:}$$

$$Tr[\text{Cov}(z)] = n(1+\rho^2(n-1))(1-\Sigma\tilde{\alpha}_k^2) \quad \text{Equation 22:}$$

The sample covariance matrix is as follows:

$$Q = \frac{1}{J-1} \sum_{j=1}^{J} (z_j - \bar{z})(z_j - \bar{z})^T \quad \text{Equation 23}$$

The trace of Equation 23 is as follows:

$$Tr(Q) = Tr\left\{ \frac{1}{J-1} \sum_{j=1}^{J} (z_j - \bar{z})(z_j - \bar{z})^T \right\} \quad \text{Equation 24}$$

$$Tr(Q) = \frac{1}{J-1} \sum_{j=1}^{J} Tr\{(z_j - \bar{z})(z_j - \bar{z})^T\} \quad \text{Equation 25}$$

$$Tr(Q) = Tr \frac{1}{J-1} \sum_{i=1}^{K} \sum_{j=1}^{J} (z_{ij} - \bar{z})^2 \quad \text{Equation 26}$$

Equation 26 may be set as follows:

$$Tr[Cov(z)] = Tr(Q) \quad \text{Equation 27:}$$

Equation 27 thus generalizes a traditional estimation Method of Moments, when applied to the 2nd moments. Further, such equation sets the sum of the distributional variances of all individual components to the sum of the observed variances of all individual components. Based on such equations, the following solutions to $\tilde{\alpha}$ and $p^2$ may be obtained, as well as ultimately $\alpha_0$ and $\alpha$, as follows.

$$\tilde{\alpha} = \frac{1}{n} \sum \frac{z_j}{J} \quad \text{Equation 28}$$

$$\rho^2 = \frac{Tr(Q)}{n(1 - \sum \tilde{\alpha}_i^2)} - 1 \quad \text{Equation 29}$$

$$Tr(Q) = \frac{1}{J-1} \sum_{i=1}^{K} \sum_{j=1}^{J} (z_{ij} - \bar{z}_i)^2 \quad \text{Equation 30}$$

$$\alpha_0 = \frac{1}{\rho^2} - 1 \quad \text{Equation 31}$$

$$\alpha = \alpha_0 \tilde{\alpha} \quad \text{Equation 32}$$

To this end, in the context of the method 200 of FIG. 2A, the estimation of the group parameters α of the group Dirichlet distribution 202 may be carried out utilizing a trace function of a covariance matrix of the group Dirichlet-multinomial distribution 204, and a trace function of a covariance matrix of the group usage data 201. Again, see Equation 27. As mentioned earlier, such technique enables use of the Direchlet distribution in the context of content category ranking by using estimations of Direchlet distribution parameters that would otherwise not be available. Further, by virtue of the collection of multiple sessions of usage data, the abovementioned parameter estimation technique may be employed so as to avoid the use multiple equations (that would result from using a traditional moment method) which, in turn, could introduce conflicts.

Specifically, as mentioned earlier in connection with the aforementioned Dirichlet-multinomial distribution setting, there are K unknown parameters that are to be estimated. After use of the first moment equation (Equation 20), K−1 parameters are obtained. By virtue of the fact that such equation is expressed in vector form, and not in scalar form, multiple parameters are involved. Further, there are K component-level equations. However, since the sum of the $\tilde{\alpha}_i$ is 1 (recalling the definition of $\tilde{\alpha}_i$ as follows: $\tilde{\alpha}_i/\alpha_0$), there are effectively K−1 unknown parameters in Equation 20.

With that, only one more independent equation is needed. If a traditional 2nd moment equation (Sample Cov(Z)=Cov (Z)) were to be used (which is in matrix form), there would be an additional K+K(K−1)/2 equations, and that would generate conflicts. However, by using Equation 27, which is only one equation, the K unknown parameters are available without introducing any conflict.

Armed with the above, the user probability list parameter $\hat{\theta}$ of the user multinomial distribution 208 may be estimated, per operation 207 of FIG. 2A, utilizing the estimated user Dirichlet distribution 206 and the individual usage data 203 as denoted here by Z. Specifically, Z may be used to estimate the user probability list parameter $\hat{\theta}$ in the prior Dirichlet distribution. More information will now be set forth regarding the use of inferences that are based on a combination of empirical information/domain knowledge (e.g. group usage data $z_{1, \ldots N}$ 201), and the observed individual usage data $z_{user}$ 203. Given the prior distribution for the likelihood vector, and given the observations where Z=z, such elements may be combined to create a solution that improves upon the individual nature of either of the two components. In one embodiment, such solution may include a Bayesian modeling approach, where the posterior distribution of θ is Dir (α+z). Therefore, the expected value of each individual component is as follows.

$$E(\theta_i | Z = z) = \frac{\alpha_i + z_i}{\sum_{i=1}^{K} \alpha_i + \sum_{i=1}^{K} z_i} \quad \text{Equation 33}$$

$$E(\theta_i | Z = z) = w_1 \left( \frac{\alpha_i}{\sum_{i=1}^{K} \alpha_i} \right) + w_2 \left( \frac{z_i}{\sum_{i=1}^{K} z_i} \right) \quad \text{Equation 34}$$

where $$w_1 = \frac{\sum_{i=1}^{K} \alpha_i}{\sum_{i=1}^{K} \alpha_i + \sum_{i=1}^{K} z_i} \quad \text{Equation 35}$$

$$w_2 = \frac{\sum_{i=1}^{K} z_i}{\sum_{i=1}^{K} \alpha_i + \sum_{i=1}^{K} z_i} \quad \text{Equation 36}$$

Equation 35 provides the component mean for the group of users, while Equation 36 provides the component mean for the individual user. For the first weight $w_1$, such weight $w_1$ decreases as the sum of the $z_i$ (the total counts for all the categories by a user) increases. That is, the average group usage is weighted less under such circumstances. For the second weight $w_2$, such weight $w_2$ decreases as the sum of $\alpha_i$ (the total effect for all the categories modeled by the group) increases. That is, the aggregated usage associated with the individual user is weighted less under such circumstances.

In one embodiment, the above equations show the posterior expectation as a weighted average ($w_1+w_2=1$) between the expectation value of the prior distribution and the expectation of the data distribution. To this end, a recommendation order based on the posterior distribution may be determined by the values of the component-wise summation between the prior distribution parameter and the sample data observation (e.g. α+z).

Thus, in the specific context of the method 200 of FIG. 2A, the first weight $w_1$ may be applied to the estimated group parameters α of the group Dirichlet distribution 202, and the second weight $w_2$ may be applied to the user probability list parameter θ of the user multinomial distribution 208. Further, such first weight $w_1$ and second weight $w_2$ may be determined based on the estimated group parameters α of the group Dirichlet distribution 202, and the individual usage data $z_{user}$ 203. Still yet, as mentioned earlier, additional individual usage data $z_{user}$ 203 may be received reflecting additional user usage activity for the particular user, and the aforementioned first weight $w_1$ and second weight $w_2$ (and thus the content ranking) may be dynamically adjusted, based on such additional individual usage data $z_{user}$ 203. More information will now be set forth regarding one possible use case scenario that may incorporate one or more of the foregoing features.

Figure 3:
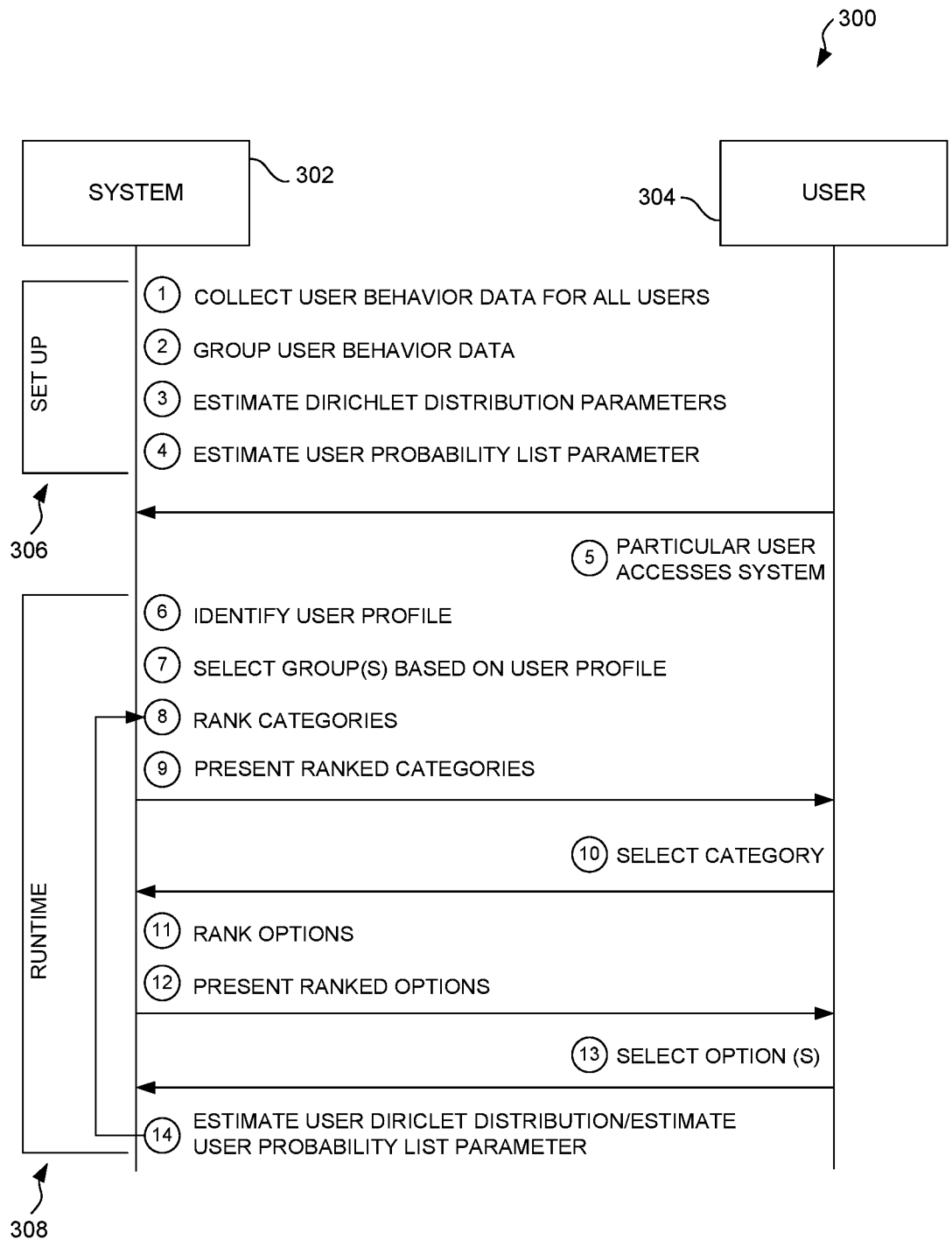
FIG. 3 illustrates a method for implementing a ranking algorithm using the method of FIG. 2A, in accordance with one embodiment.

FIG. 3 illustrates a method 300 for implementing a ranking algorithm using the method 200 of FIG. 2A, in accordance with one embodiment. As an option, the method 300 may be implemented in the context of any one or more of the embodiments set forth in any previous and/or subsequent figure(s) and/or description thereof. However, it is to be appreciated that the method 300 may be implemented in the context of any desired environment.

As shown, the method 300 is implemented using a system 302 in the form of one or more servers that is capable of communication with a user 304 equipped with an accessing device. Such communication may occur over any desired one or more networks such as the Internet. In other embodiments, the system 302 may include a device (e.g. phone, tablet, computer, etc.) that allows direct access by the user 304. Further, the method 300 may include a set up stage 306 and a runtime stage 308.

As a start of the set up stage 306, at step 1, individual usage data is collected by the system 302 for an overall set of users (e.g. all users, etc.). Further, at step 2, such overall individual usage data is grouped into group usage data (e.g. the group usage data $z_{1, \ldots, N}$ 201 of FIG. 2A) by the system 302. Further, such usage activity data may be collected in any desired manner (e.g. receiving by monitoring user selections on-line, receiving user information from third party sources, etc.).

As mentioned earlier, the usage activity data is collected across multiple sessions. Further, in various embodiments, any aspects of such sessions may be automatically configured. For example, such automatic configuration may extend to when the set up stage 306 is started, when any associated sessions are started and stopped, as well as whether the sessions are repeated, etc. Even still, such automatic configurability may also apply to when the aforementioned runtime stage 308 is initiated.

With continuing reference to FIG. 3, at step 3, a plurality of group parameters of a group Dirichlet distribution are estimated by the system 302. In one embodiment, this may be accomplished via operation 205 of the method 200 of FIG. 2A whereby the group parameters α of the group Dirichlet distribution 202 are estimated utilizing the group Dirichlet-multinomial distribution 204 in connection with the group usage data $z_{1, \ldots, N}$ 201 for each of the groups.

Next, at step 4, a user probability list parameter is estimated by the system 302. After step 4, the method 300 may proceed with the runtime stage 308 by the system 302 permitting access to the particular user 304 at step 5. Such access may be accomplished by allowing the user 304 to log-in after a registration process has been completed. At step 6, a user profile associated with the user 304 is identified. Such user profile may be generated during the aforementioned registration process and/or any other more passive mechanism (e.g. monitoring user behavior on-line, etc.).

In any case, at step 7, one or more groups are selected so that the group distribution(s) and associated parameter(s) that are used in connection with content ranking best represent the particular user 304. In one embodiment, this selection may be accomplished by identifying at least one aspect of the user profile (e.g. age, sex, behavior characteristic, etc.) with that of the appropriate group distribution(s).

Figure 4A:
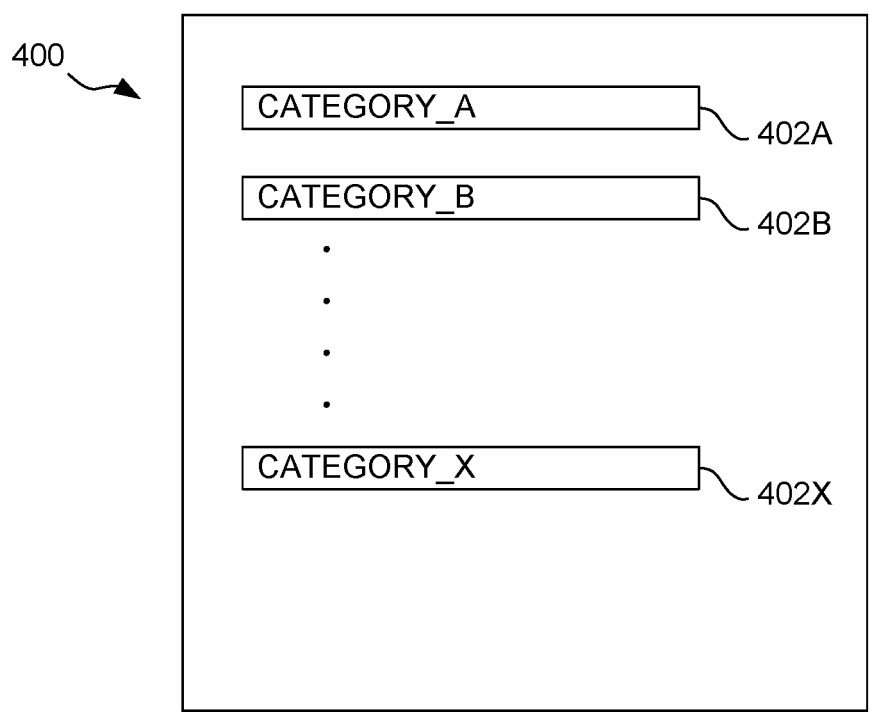
FIG. 4A illustrates an interface by which various ranked categories may be presented to the user, in accordance with one embodiment.

To this end, the group distribution(s) and associated parameter(s) of the selected group may be used in connection with ranking categories of content for presentation to the user 304. See step 9. After being presented with the ranked categories of content, the user 304 may, at step 10, select at least one category. FIG. 4A illustrates an interface 400 by which various ranked categories 402A, 402B, 402X may be presented to the user, in accordance with one embodiment.

Figure 4B:
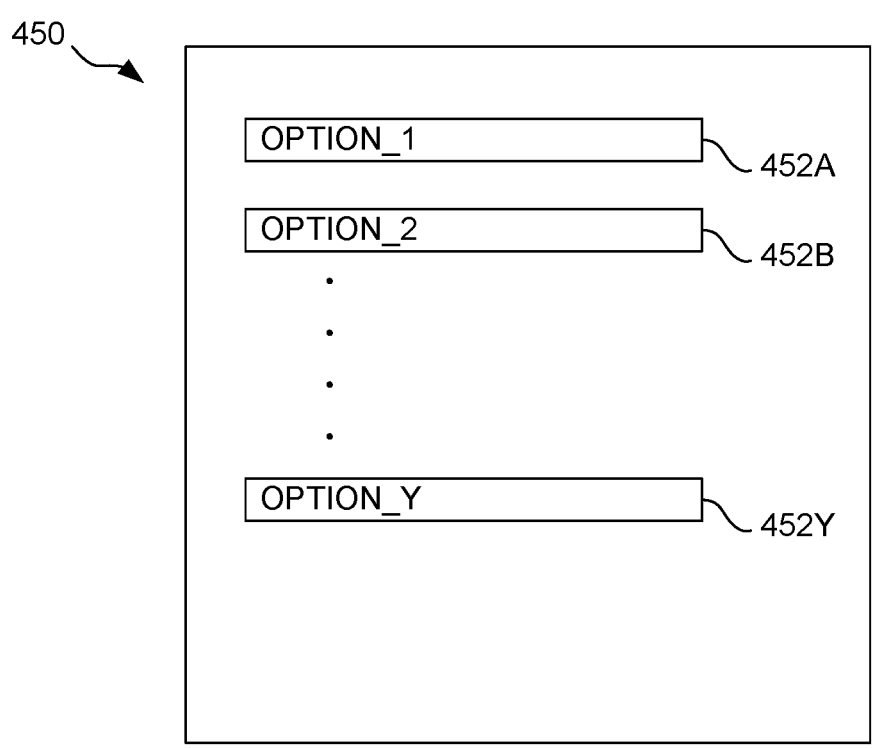
FIG. 4B illustrates an interface by which various ranked options may be presented to the user, in accordance with one embodiment.

In response (or beforehand), the system 302 may rank options (e.g. specific items of content, etc.) at step 11, for presenting the ranked content options in connection with the selected one or more ranked categories, as well, at step 12. FIG. 4B illustrates an interface 450 by which various ranked options 452A, 452B, 452X may be presented to the user, in accordance with one embodiment. Similar to step 10, the user 304 may select one or more of the options at step 13.

In various embodiments, the options may be ranked at step 11 utilizing any desired technique. For example, the options may be ranked using collaborative filtering, a plurality of rules, or matrix characteristics. In an embodiment where the ranking occurs using collaborative filtering, the abovementioned options may be ranked, based on a selection from similar users. In this embodiment, the aforementioned category ranking and recommendation method, detailed earlier, in combination with such collaborative filtering, in sequence, may be used for item recommendation. Thus, in such embodiment, the category ranking method (e.g. the method 200 of FIG. 2A) may be used to rank the categories for presenting the user with the content categories in a ranked order. Further, after the user selects a category from the ranked category list, collaborative filtering may then be used to select from all the items in that category and recommend the selected items to the user via ranking. In various embodiments, an order of all the selected options in the chosen category may be based on time, importance, relevance, and/or any other criteria. Further, since the categories are ranked first and item recommendations in a particular category is processed thereafter via collaborative filtering, a performance of the collaborative filtering in the particular category is enhanced given a homogeneity of the particular category.

When the user is finished with the items in the present category, the user may be directed back to the next category (e.g. which may be highlighted) or to a separately selected (and different) category. The option recommendation mechanism in the new category may be the same (or different) with respect to the previous category. Further, the recommendation may terminate when all the items in all the categories are consumed, or when the user clicks to close the current information consumption (e.g. news) block.

It should be noted that, in some embodiments, the individual usage data associated with the particular user (who has just accessed the system 302 for the first time) may not yet be available during a first iteration of steps 5-13, in which case the group usage data (or a component thereof) may be solely used for category ranking purposes until receipt of the individual usage data. Further, such individual usage data may be collected for the particular user during steps 5-13 of FIG. 3. To this end, steps 6-13 may be repeated per step 14, for accessing different content, where any future category ranking (during future iterations of steps 5-13) may be based both on group usage data, as well as individual usage data for the particular user 304.

To this end, at step 14, a user Dirichlet distribution is estimated by the system 302. Again, in one possible embodiment, this may be accomplished in the context of the method 200 of FIG. 2A whereby the user Dirichlet distribution 206 is estimated, utilizing the estimated group parameters α of the group Dirichlet distribution 202 associated with at least one of the groups, and the individual usage data $z_{user}$ 203.

Also at step 14, the aforementioned user probability list parameter estimated at step 4 may be re-estimated by the system 302, this time taking into account the collected user usage activity. In one possible embodiment again incorporating the method 200 of FIG. 2A, this may be accomplished via operation 207 whereby the user probability list parameter θ of the user multinomial distribution 208 is estimated utilizing the estimated user Dirichlet distribution 206 in connection with the individual usage data $z_{user}$ 203. By this design, the system 302 may continue to collect more individual usage data and incorporate the same into the category ranking process.

In the context of one possible embodiment that involves a news category recommendation, the above described framework may be viewed as having two layers of input data for use in ranking news categories. An output from a first layer of data may be used for general recommendation purposes, and an output of a second layer of data may be used for personalized purposes.

With respect to the first input data layer, for each user, data relating to a user consumption of historical news categories for each news article may be collected, including a date and time, as well as a time duration of the consumption of the news article in each session. In one embodiment, a news article, and its associated news categories may be from a news data source. Additionally, a historical data duration (e.g. data training period, etc.) may be defined, as needed, although it may generally be at least one month, and, in some embodiment, not exceed two years.

With such data, for each user at each session, an order and order probability (e.g. the likelihood that a particular news category will be selected relative to other news categories) may be derived from the news categories that the user consumption. In one embodiment, multiple sessions for the user may occur during the training period. In another embodiment, the processed data from all of the users in all of the sessions may be aggregated, such that an order with probability rankings of all the news categories may be achieved (e.g. using Equation 2, etc.).

With respect to the input data layer 2, for each user, an initial recommendation made be provided for the general news categories by a certain order based on input data layer 1. In one embodiment, this initial recommendation is the same for all of the users. Additionally, data relating to a user consumption of a historical news categories for each news article may be collected, including the date and time, as well as the time duration of the consumption of the news article in each session. Such duration period may be referred to as an individual user learning period. In one embodiment, the duration period may be open-ended (e.g. with time or duration constraints, etc.). After collecting such data, personalized recommendation may be made for the user using algorithms detailed herein (e.g. Equations 10-13, etc.).

In various embodiments, the algorithms contained herein may be implemented in any language. For example, in one embodiment, a R-implementation can be used once the data (or sample data) has been obtained. Further, once implemented in R, the algorithms may be translated to other languages. Further, the algorithms detailed herein may be applicable to any category recommendation situation, including but not limited to, news, music, movies, apps, games, etc. In another embodiment, display real-estate space (e.g. on a display, smart phone screen, etc.) for showing items may be constrained (with or without purpose). With this constraint, a complete probability distribution list may be used (and truncated by the constrained limit) to control what is displayed.

Figure 4C:
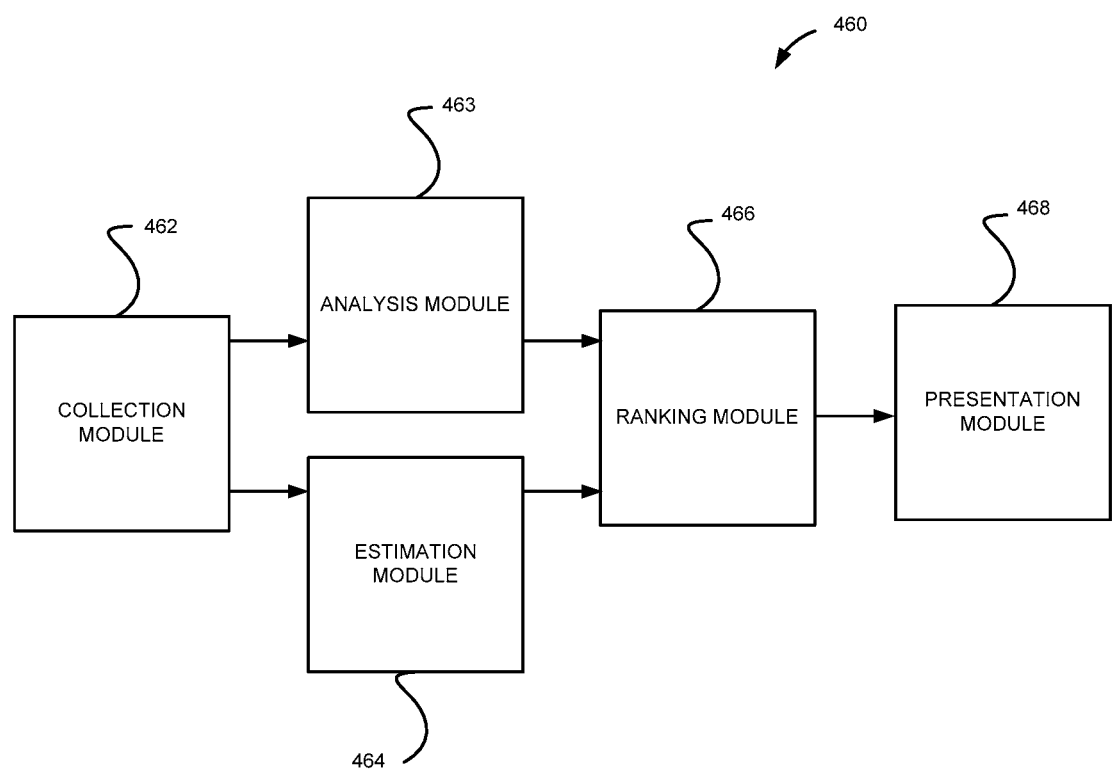
FIG. 4C illustrates a system for ranking content categories, in accordance with an embodiment.

FIG. 4C illustrates a system 460 for ranking content categories, in accordance with an embodiment. As an option, the system 460 may be implemented with one or more features of any one or more of the embodiments set forth in any previous and/or subsequent figure(s) and/or the description thereof. However, it is to be appreciated that the system 460 may be implemented in the context of any desired environment.

As shown, a collection means in the form of a collection module 462 is provided for collecting multiple sessions of usage data for usage activities of a plurality of users on a plurality of categories of content, and individual usage data for usage activities of at least one user on the categories of content (e.g. see operations 102 and 106 of FIG. 1, etc.). In various embodiments, the collection module 462 may include at least one processor or a portion thereof (to be described later) and any software or instructions controlling the same, and/or any other circuitry capable of the aforementioned functionality.

Also included is an analysis means and an estimation means in the form of an analysis module 463 and an estimation module 464, respectively, both in communication with the collection module 462 for analyzing the usage data for an average group usage of each category across the sessions and a variation of the average group usage of each category across the sessions, and estimating category usage on each category for the at least one user based on a weighted combination of the aggregated usage and the average group usage according to the variation, respectively (e.g. see operations 104 and 108 of FIG. 1, etc.). In various embodiments, the analysis module 463 and the estimation module 464 may each include, but is not limited to at least one processor or a portion thereof (to be described later) and any software or instructions controlling the same, and/or any other circuitry capable of the aforementioned functionality.

With continuing reference to FIG. 4C, ranking means in the form of a ranking module 466 is in communication with the analysis module 463 and the estimation module 464 for ranking the categories of content utilizing the estimated category usage on each category (e.g. see operation 110 of FIG. 1, etc.). In various embodiments, the ranking module 466 may include, but is not limited to at least one processor or a portion thereof (to be described later) and any software or instructions controlling the same, and/or any other circuitry capable of the aforementioned functionality.

Presentation means in the form of a presentation module 468 is in communication with the ranking module 466 for sending a presentation including the ranking to a user device of the at least one user for being output via an interface (e.g. see operation 112 of FIG. 1, etc.). In various embodiments, the presentation module 468 may include, but is not limited to at least one processor or a portion thereof (to be described later) and any software or instructions controlling the same, and/or any other circuitry capable of the aforementioned functionality.

Figure 5:
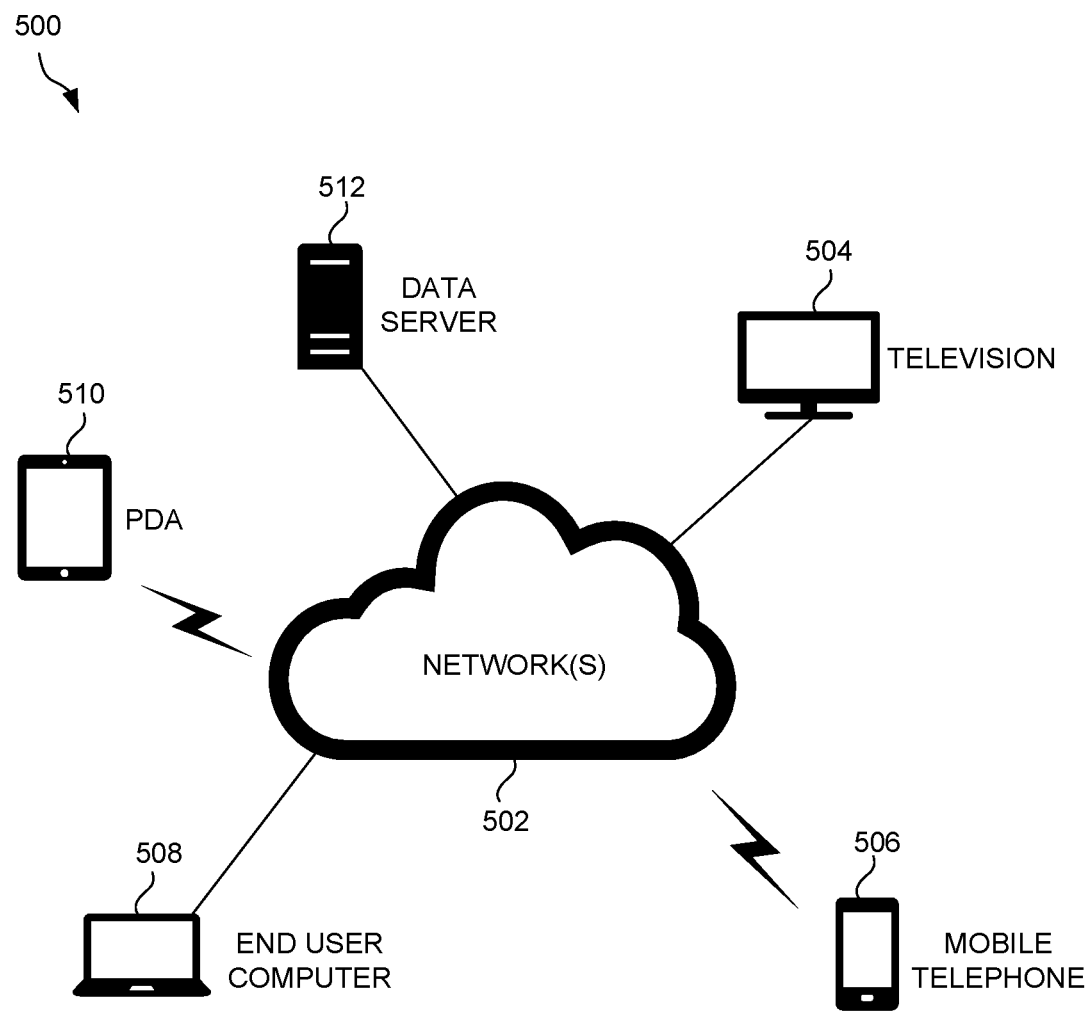
FIG. 5 is a diagram of a network architecture, in accordance with one embodiment.

FIG. 5 is a diagram of a network architecture 500, in accordance with one embodiment. As shown, at least one network 502 is provided. In various embodiments, any one or more components/features set forth during the description of any previous figure(s) may be implemented in connection with any one or more of the components of the at least one network 502.

In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 512 and a computer 508 may be coupled to the network 502 for communication purposes. Such computer 508 may include a desktop computer, lap-top computer, and/or any other type of logic. Still yet, various other devices may be coupled to the network 502 including a personal digital assistant (PDA) device 510, a mobile phone device 506, a television 504, etc.

Figure 6:
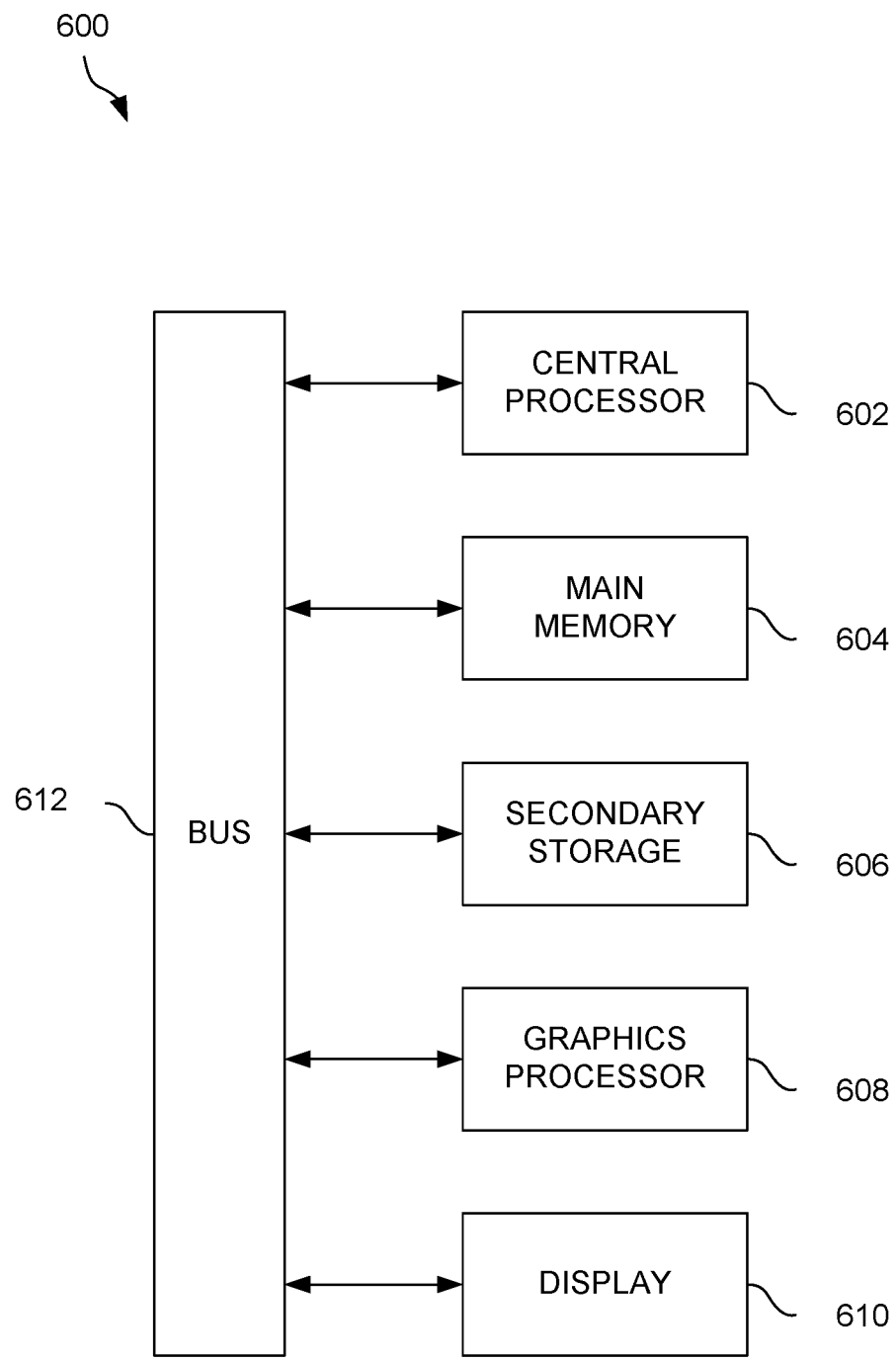
FIG. 6 is a diagram of an exemplary system, in accordance with one embodiment.

FIG. 6 is a diagram of an exemplary system 600, in accordance with one embodiment. As an option, the system 600 may be implemented in the context of any of the devices of the network architecture 500 of FIG. 5. However, it is to be appreciated that the system 600 may be implemented in any desired environment.

As shown, a system 600 is provided including at least one processor 602 which is connected to a bus 612. The system 600 also includes memory 604 [e.g., hard disk drive, solid state drive, random access memory (RAM), etc.]. The memory 604 may include one or more memory components, and may even include different types of memory. The system 600 also includes a display 610 in the form of a touchscreen, separate display, or the like. Further included is a graphics processor 608 coupled to the display 610.

The system 600 may also include a secondary storage 606. The secondary storage 606 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the memory 604, the secondary storage 606, and/or any other memory, for that matter. Such computer programs, when executed, enable the system 600 to perform various functions (as set forth above, for example). Memory 604, secondary storage 606 and/or any other storage comprise non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), or the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; or the like.

It should be understood that the arrangement of components illustrated in the Figures described are exemplary and that other arrangements are possible. It should also be understood that the various system components defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer-implemented method, comprising:
    collecting multiple sessions of usage data for usage activities of a plurality of users on a plurality of categories of content, the users being associated with a group;
    analyzing the usage data for an average group usage of each category across the sessions and a variation of the average group usage of each category across the sessions, wherein the variation of the average group usage of each category across the sessions is derived from a second variation in connection with the average group usage of each category across the sessions, and wherein the second variation comprises one or more of a variance, a covariance, or a spread;
    collecting individual usage data for usage activities of at least one user on the categories of content, the individual usage data reflecting an aggregated usage of each category for the at least one user;
    estimating category usage on each category for the at least one user based on a weighted combination of the aggregated usage and the average group usage according to the variation, an amount of weight of the aggregated usage in the weighted combination being inversely related to the variation;
    ranking, via at least one processor, the categories of content, utilizing the estimated category usage on each category; and
    sending a presentation including the ranking to a user device of the at least one user for being output via an interface.

2. The computer-implemented method of claim 1, and further comprising:
    collecting additional individual usage data for additional usage activities of the at least one user on the categories of content; and
        dynamically adjusting the ranking based on the additional individual usage data.

3. The computer-implemented method of claim 1, and further comprising:
    receiving a selection of one or more of the ranked categories via the interface; and ranking a plurality of content options for presenting the ranked content options in
    connection with the selected one or more ranked categories via the interface for selection by the at least one user.

4. The computer-implemented method of claim 3, wherein the options are ranked utilizing at least one of collaborative filtering, a plurality of rules, or matrix characteristics.

5. The computer-implemented method of claim 1, wherein at least one parameter associated with the average group usage is estimated via the analysis of the usage data by:
    generating a first covariance matrix of a first distribution; calculating a first trace of the first covariance matrix; and
    setting a second trace of a second covariance matrix of a second distribution to be the first trace of the first covariance matrix.

6. The computer-implemented method of claim 5, wherein the first distribution includes a Dirichlet-multinomial distribution.

7. The computer-implemented method of claim 5, wherein the second distribution includes a Dirichlet distribution.

8. The computer-implemented method of claim 5, wherein the at least one parameter includes at least one of a location parameter, a concentration parameter, or a mean parameter.

9. The computer-implemented method of claim 1, wherein the at least one user includes one user of the plurality of users.

10. An apparatus, comprising:
    a non-transitory memory comprising instructions, multiple sessions of usage data for usage activities of a plurality of users of a group on a plurality of categories of content, and individual usage data for usage activities of at least one user on the categories of content, the individual usage data reflecting an aggregated usage of each category for the at least one user; and one or more processors in communication with the memory, wherein the one or more processors execute the instructions to:

analyze the usage data for an average group usage of each category across the sessions and a variation of the average group usage of each category across the sessions, wherein the variation of the average group usage of each category across the sessions is derived from a second variation in connection with the average group usage of each category across the sessions, and wherein the second variation comprises one or more of a variance, a covariance, or a spread;

estimate category usage on each category for the at least one user based on a weighted combination of the aggregated usage and the average group usage according to the variation, an amount of weight of the aggregated usage in the weighted combination being inversely related to the variation;

rank the categories of content, utilizing the estimated category usage on each category; and send a presentation including the ranking to a user device of the at least one user for being output via an interface.

11. The apparatus of claim 10, wherein the one or more processors further execute the instructions to:

collect additional individual usage data for additional usage activities of the at least one user on the categories of content; and dynamically adjust the ranking based on the additional individual usage data.

12. The apparatus of claim 10, wherein the one or more processors further execute the instructions to:

receive a selection of one or more of the ranked categories via the interface; and rank a plurality of content options for presenting the ranked content options in connection with the selected one or more ranked categories via the interface for selection by the at least one user.

13. The apparatus of claim 12, wherein the content options are ranked utilizing at least one of collaborative filtering, a plurality of rules, or matrix characteristics.

14. The apparatus of claim 10, wherein at least one parameter associated with the average group usage is estimated via the analysis of the usage data by:

generating a first covariance matrix of a first distribution; calculating a first trace of the first covariance matrix; and setting a second trace of a second covariance matrix of a second distribution to be the first trace of the first covariance matrix.

15. The apparatus of claim 14, wherein the first distribution includes a Dirichlet-multinomial distribution.

16. The apparatus of claim 14, wherein the second distribution includes a Dirichlet distribution.

17. The apparatus of claim 14, wherein the at least one parameter includes at least one of a location parameter, a concentration parameter, or a mean parameter.

18. The apparatus of claim 10, wherein the at least one user includes one user of the plurality of users.

19. A non-transitory computer-readable media storing computer instructions, that when executed by one or more processors, cause the one or more processors to perform the steps of:

collecting multiple sessions of usage data for usage activities of a plurality of users on a plurality of categories of content, the users being associated with a group;

analyzing the usage data for an average group usage of each category across the sessions and a variation of the average group usage of each category across the sessions, wherein the variation of the average group usage of each category across the sessions is derived from a second variation in connection with the average group usage of each category across the sessions, and wherein the second variation comprises one or more of a variance, a covariance, or a spread;

collecting individual usage data for usage activities of at least one user on the categories of content, the individual usage data reflecting an aggregated usage of each category for the at least one user;

estimating category usage on each category for the at least one user based on a weighted combination of the aggregated usage and the average group usage according to the variation, an amount of weight of the aggregated usage in the weighted combination being inversely related to the variation;

ranking the categories of content, utilizing the estimated category usage on each category; and sending a presentation including the ranking to a user device of the at least one user for being output via an interface.

20. The non-transitory computer-readable media of claim 19, wherein the computer instructions cause the one or more processors to further perform the steps of:

collecting additional individual usage data for additional usage activities of the at least one user on the categories of content; and dynamically adjusting the ranking based on the additional individual usage data.

* * * * *